(12) United States Patent
Greene et al.

(10) Patent No.: US 6,271,825 B1
(45) Date of Patent: *Aug. 7, 2001

(54) CORRECTION METHODS FOR BRIGHTNESS IN ELECTRONIC DISPLAY

(75) Inventors: Raymond G. Greene, Ovid; Robert H. Katyl, Vestal; J. Peter Krusius; Boris Yost, both of Ithaca, all of NY (US)

(73) Assignee: Rainbow Displays, Inc., Endicott, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/173,468

(22) Filed: Oct. 14, 1998

Related U.S. Application Data (63) Continuation of application No. 08/636,604, filed on Apr. 23, 1996.

(51) Int. Cl.[7] ..................................................... G09G 5/10
(52) U.S. Cl. ............................ 345/147; 345/207; 345/89; 345/88
(58) Field of Search ................................ 345/87, 103, 98, 345/100, 147, 1–2, 3, 92, 903, 207, 89, 88, 63, 431, 199; 348/383, 757, 687, 631, 607, 609; 382/167, 162

(56) References Cited

U.S. PATENT DOCUMENTS

| 4,825,201 | * | 4/1989 | Watanabe et al. ................... 345/1 |
| 5,206,633 | * | 4/1993 | Zalph .................................... 345/92 |
| 5,416,890 | * | 5/1995 | Beretta ................................. 345/431 |
| 5,555,035 | * | 9/1996 | Mead et al. ......................... 348/757 |
| 5,650,942 | * | 7/1997 | Granger ............................... 358/500 |
| 5,805,117 | * | 9/1998 | Mazurek et al. ...................... 345/1 |
| 6,005,968 | * | 12/1999 | Granger ............................... 382/162 |
| 6,020,868 | * | 2/2000 | Greene et al. ........................ 345/88 |

OTHER PUBLICATIONS

I. Gorog, "Displays for HDTV:Direct View CRTs and Projection Systems", Proceedings of the IEEE, vol. 82, No. 4, pp. 520–536, 1994.*

(List continued on next page.)

*Primary Examiner*—Richard Hjerpe
*Assistant Examiner*—Francis Nguyen
(74) *Attorney, Agent, or Firm*—Salzman & Levy (57) ABSTRACT

The present invention features methods and apparatus for the correction of spatial non-uniformities in brightness that arise from materials, manufacturing, operational and lighting parameter variations in electronic color, flat-panel displays. The methods apply both to gradual non-uniformities usually found in monolithic displays as well as to abrupt variations present in displays composed of a multitude of tiles. Corrections are performed on the electronic drive signals used to control the brightness of selected display pixels. Parameters required for these corrections are acquired via brightness measurements over selected pixels and stored after suitable transformations. The stored parameters are then used to scale and/or interpolate drive signals in real time. Corrections are performed such that any remaining gradual and abrupt brightness non-uniformities fall below the detectable threshold under the intended viewing conditions. The correction methods can also be used for correcting brightness non-uniformities arising from uneven aging of the display. Apparatus for an automatic self-calibrating function is also described.

26 Claims, 6 Drawing Sheets

OTHER PUBLICATIONS

H. Henck Van Leeuven et al., "A Digital Column Driver IC for AMLCDs", Euro–Display, pp. 453–456, 1993.*

H. Okada et al., "An 8–Bit Digital Data Driver for AML-CDs", Society for Information Display International Symposium Digest of Technical Papers, vol. XXV, pp. 347–350, 1994.*

M. Hijikiwa et al., "Future Prospects of Large Area Direct View LCDs", Society for Information Display International Symposium Digest of Technical Papers, vol. XXVI, pp. 147–149, 1995.*

N. Mazurek et al., A 51–in Diagonal Tiled LCD VGA Monitor; SID International Symposium, Digest of Technical Papers, vol. 24, pp. 614–617, 1993.*

D. Nickerson, "History of the Munsell System, Company and Foundation, 1–111", Color Research Applications, vol. 1, pp. 7–10, 69–77, 121–135, 1976.*

S. Hecht, "The Visual Discrimination of Intensity and the Weber–Fechner Law", Journal of General Physiology, vol. 7, p. 214, 1924*

K. B. Benson editor, Television Engineering Handbook Featuring HDTV Systems, McGraw–Hill, 1992.*

G. Wyszecki et al., Color Science, $2^{nd}$ Edition Wiley, New York, 1982.*

* cited by examiner

CORRECTION METHODS FOR BRIGHTNESS IN ELECTRONIC DISPLAY

This application is a continuation of Ser. No. 08/636,604 Apr. 23, 1996

FIELD OF THE INVENTION

This invention pertains to the field of electronic displays and, more particularly, to all electronic gray-tone and color displays, irrespective of their construction. The invention details a method for correcting spatial non-uniformities in the brightness of displays, whether they be of monolithic construction or assembled from small tiles.

BACKGROUND OF THE INVENTION

Images on electronic displays are derived from a two-dimensional array of pixels, each of which represents one small element of the image. The resulting image is presented to the observer in a 1:1 size in direct-view displays, while projection displays magnify the image size, using an optical lens system. In black-and-white displays, each pixel displays one of two colors, black or white; in a gray-tone display, pixels can produce a specified number of gray tones between black and white. Since colors can be formed by combining primary colors, i.e., red (R), blue (B) and green (G) light, in specified ratios, electronic color displays use primary-color elements in each pixel, in order to form a desired image via additive color mixing. In order to show still images, pixels can carry the same information all of the time; for moving images, the content of each pixel must be redefined periodically. Full-motion images are usually required to be redrawn 30 to 75 times per second.

Pixels can be accessed by using several techniques, including scan-, grid-, shift-, matrix- and direct-addressing. If, for example, the display carries an array of N×M pixels and it has to be redrawn n times each second, the data sent to each pixel must be provided in $1/(n*N*M)$ seconds and then held constant for $(N*M-1)/(n*N*M)$ seconds, as other pixels are being defined. In the current American television (TV) standard (NTSC), each frame has about 250,000 pixels in a display area, with an aspect ratio of 4×3, which are refreshed at the rate of 30 frames/second. One of the new picture formats proposed for American high-definition television (HDTV) to the Federal Communications Commission (FCC) has an aspect ratio of 16×9 and a refresh rate of 60 frames/second. Pixels are arranged into 1280 horizontal and 720 vertical lines or, alternatively, 1920 horizontal and 1080 vertical lines (I. Gorog, "Displays for HDTV: Direct View CRTs and Projection Systems", Proceedings of the IEEE, vol. 82, no. 4, pp. 520–536, 1994). The typical, low-resolution computer display (VGA) has 480 rows of 640 pixels, or, a total of 307,200 pixels at a refresh rate of 72 frames/second.

Electronic displays can be implemented by using a multitude of different technologies, including, for example, the cathode-ray tube (CRT), electroluminescent displays (ELDs), light-emitting diode displays (LEDs) and liquid crystal displays (LCDs). While CRT displays have a depth comparable to the height of the screen, ELDs and LCDs belong to the class of flat-panel displays (FPDs), the dimension of which, in their direction perpendicular to the image plane, is much smaller than that of the CRT. With the CRT, either one (gray-tone) or three (color) electron beams scan along horizontal lines in order to access each pixel. All color data is thus carried to the pixels via the electron beam current. FPDs (such as the LCDs) use matrix-addressing, in which each pixel is accessed via row and column lines. The pixel at the cross-point of a specific row and column line can be selected via passive or active techniques. In the passive case, the non-linearity of the LCD pixel's element is used for the selection. Active, matrix-addressed LCDs (AMLCDs), on the other hand, require a device (e.g., a transistor) for the selection of the pixel. In active matrix-addressing, a row of pixels is usually selected at once by placing a specific voltage on the row line (usually the gate line of the transistor). Pixel data is then made available via column lines to each of the pixels (usually the drain of the transistor) in the selected row. An entire row of pixels can be accessed in parallel in active matrix-addressing. Coupling between pixels and row and column lines is one of the disadvantages of matrix-addressing.

The size of an electronic display is usually specified by the length of the diagonal of the pixel array. Computer displays generally have sizes of between 10" and 21"; home television displays generally have sizes of between 19" and 31". Large public displays (e.g., used in sports arenas) generally feature sizes that range between 200" and 700".

The resolution of the image on an electronic display is determined by the pitch of the pixels, i.e., the smaller the pixel pitch, the finer the details that can be displayed. Typical computer displays have pixel pitches on the order of 0.3 mm, and they can be viewed from as close as 30 cm without the human eye resolving the mosaic structure of the pixels. Large-screen, public displays have pixel pitches as large as 30 mm [see, e.g., Panasonic Astrovision, AZ-3000 Series High-Density Fluorescent Displays, Panasonic Corporation, Japan, 1995]. Viewing distances of at least 10 meters are required for such displays.

A duty cycle is defined as the time spent for turning on individual pixels or a row of pixels. With a CRT, each pixel is accessed individually and sequentially by sweeping the electron beam. Thus, for example, in a VGA display with N×M=640×480 and n=72 Hz, the dwell time of the electron beam on each pixel is 46 ns. By definition this equals the duty cycle of this CRT. In an FPD-VGA display with the same frame rate, the dwell time is 640 times longer, or, 29 $\mu s$, due to parallel matrix-addressing.

The brightness of an image on an electronic display is characterized by using the photometric quantity of luminance measured in candela per unit area ($cd/m^2$=1 nit). The luminous efficiency is used to describe how much light the display produces per the amount of electrical energy provided to the display. LCDs operate with highly efficient backlights (such as fluorescent lamps) with a luminous efficiency as high as 55 lm/W and a typical light transmittance of about 4%. This gives a typical luminous efficiency of 2.2 lm/W for AMLCDs, which exceeds the performance of all other display technologies. The brightness of LCDs can be increased by simply turning up the intensity of the backlight.

The contrast in a display is another important attribute. It describes the achievable light intensity modulation in the image between the brightest and dimmest pixels. Images with greater contrast are more sparkling in appearance. The best AMLCDs achieve contrast ratios as large as 100:1. Ambient illumination affects the contrast of the displayed image. The component of the ambient illumination that is reflected from the display's surfaces will be added to the emitted intensity of the image to be displayed. The higher the contrast, the more tolerant the display is to ambient light. Of all displays, AMLCDs have the highest tolerance to ambient light, because of the presence of polarizers and because of the ability of AMLCDs to independently adjust the intensity of the backlight.

The viewing characteristics of electronic displays are specified by the viewing distance and viewing angle ranges. The minimum viewing distance is related to the pixel pitch via the resolution ability of the observer's retina. Displayed images are usually best viewed at normal incidence. Maximum horizontal and vertical viewing angles away from the normal are determined by the type of the display and the layout and the optical design of the pixels. Viewing angle ranges of ±30° horizontal and ±15° vertical are average for typical AMLCD displays.

Full-color displays are expected to be able to display 256 (8-bit) shades of each of the highly saturated primary colors red, blue and green. This results in a total of $2563^3$ or 16,777,216 colors that (in principle) can be displayed. Full-color capability has been available on CRTs for quite some time via the selection of the R, B and G phosphor materials, as well as the control of the electron beam. Full color was demonstrated for the first time with LCDs in 1993, by developing 8-bit data driver circuits [G. H. Henck Van Leeuven et al., "A Digital Column Driver IC for AMLCDS", Euro-Display, pp. 453–456, 1993; see also H. Okada, K. Tanaka, S. Tamai and S. Tanaka, "An 8-Bit Digital Data Driver for AMLCDs", Society for Information Display International Symposium Digest of Technical Papers, vol. XXV, pp. 347–350, 1994]. To date, several manufacturers have demonstrated full color AMLCDs by using amorphous silicon (a-Si), thin-film transistors (TFT) as the switches. Saturated primary colors are defined by using a uniform "white" backlight in combination with three color filters. Driver electronics is used to provide an optimal linearization of the liquid crystal response, in order to facilitate the additive mixing of colors.

Direct-view electronic displays with diagonals up to about 31" are usually manufactured in monolithic form, with the entire pixel array fabricated on a single continuous medium. The size of a commercial CRT is limited by the deflection optics and the weight of the unit to about 35". Commercial, monolithic AMLCDs are currently limited to sizes less than 12" because of manufacturing yield and cost. Commercial, 16" AMLCD displays are in product development. Display sizes of up to 21" have been demonstrated in research (M. Hijikigawa and H. Take, "Future Prospects of Large-Area Direct View LCDs", Society for Information Display International Symposium Digest of Technical Papers, vol. XXVI, pp. 147–149, 1995). Very large electronic displays cannot be made in a monolithic fashion. Rather, each pixel is separately fabricated, and then the display array can be assembled by accurately arranging pixels into rows and columns. The alignment process is difficult and cannot be made with high precision over large areas. As a consequence, the pixel pitch in large-screen displays usually is on the order of at least 30 mm.

Intermediate-sized electronic displays with pixel pitches from about 0.6 to 3 mm can be assembled, in principle, from smaller monolithic pieces, with each carrying many pixels [see e.g., N. Mazurek, T. Zammit, R. Blose, and J. Bernkopf, "A 51-in Diagonal Tiled LCD VGA Monitor," SID International Symposium, Digest of Technical Papers, vol. 24, pp. 614–617, 1993]. These monolithic pieces are then arranged into a regularly tiled array to form a full display. In tiled displays, the pixel pitch on all tiles is preferably the same. Because of the small size of the tiles, this can be achieved with a tightly-controlled manufacturing process. The seam between two adjacent tiles should be large enough to facilitate assembly. The seam will be visible to the human observer, unless the pixel spacing across the seam is the same as the pixel spacing on the tiles. This is very difficult to achieve. Consequently, to date, commercial prototype, tiled displays have had visible seams between the tiles. The minimum achievable pixel pitch in tiled displays is, therefore, determined by the available assembly technology.

SUMMARY OF THE INVENTION

This invention describes methods and apparatus for the correction of spatial non-uniformities in brightness that arise from the materials, manufacturing and operational parameter variations in electronic color displays. Such non-uniformities can introduce gradual or abrupt variations in the displayed image. Gradual non-uniformities are usually found on monolithic display screens, while displays that are composed of a multitude of smaller tiles (with each carrying a single pixel or an array of pixels), exhibit abrupt non-uniformities at the edges thereof. Combinations of abrupt and gradual non-uniformities may also exist in displays. Brightness non-uniformities are visible to the observer if the magnitude of the disturbance crosses the human eye's threshold sensitivity for brightness.

This invention comprises methods and apparatus for correcting brightness variations across the pixels of electronic displays, whether these variations arise from the primary colors themselves, or their additive mixing to produce other colors from these primary colors. These methods applies only to the correction of brightness non-uniformities. Methods for correcting color variations, or combinations of both brightness and color variations, are described in co-pending patent application, Ser. No. 08/628,308, filed on Apr. 5, 1996, herein incorporated by reference.

The correction methods incorporate the measurement of the brightness characteristics of the display. Corrections can be applied to selected pixels or all pixels of the display. Corrections are performed on the electronic drive signals that control the brightness of the primary color elements of the chosen pixels on the display. The measured brightness characteristics are expressed in terms of a set of parameters which are stored after suitable transformations in non-volatile memory. The stored parameters are selectively retrieved during the operation of the display and used to scale and/or interpolate drive signals in real time.

The modifications of the drive signal can be realized using serial or parallel electronic implementations. In the serial case the controller, pixel processor, and parameter storage are centralized and operate on the entire pixel data stream. In the parallel implementation these functions are performed by multiple smaller functional units on the pixel data stream arriving at each column driver circuit. Corrections are performed with respect to a chosen reference system such that any remaining gradual and abrupt brightness non-uniformities over the selected display pixels fall below the detectable threshold under the intended viewing conditions. These correction methods can also be used for correcting brightness non-uniformities arising from an uneven aging of the display.

Apparatus for an automatic self-calibrating function is described herein as well. It provides a capability to correct the display for brightness non-uniformities arising from manufacturing, operational conditions, aging, and the viewing environment (ambient light).

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Generally speaking, this invention features methods for correcting brightness variations across the pixels of electronic displays, whether these variations arise from the primary colors themselves, or their additive mixing to produce other colors from these primary colors, or other components of a display (such as backlight sources).

Color Classification, Definition and Uniformity

Every color has three basic characteristics: hue, lightness and chroma. Hue is the property that distinguishes and gives each color its name. Lightness measures the amount of light reflected from the hue. Chroma measures the amount of saturation or concentration thereof. There are two common ways to classify colors by using these characteristics. The Munsell system was devised by the American portrait painter Albert Munsell in the early 1900s (D. Nickerson, "History of the Munsell System, Company and Foundation, 1–111", *Color Research Applications,* vol. 1, pp. 7–10, 69–77, 121–130, 1976). The Munsell system classifies each color (hue) according to value (which is related to lightness) and chroma. Munsell's classification is subjective due to the differences between individuals in perception of colors. The CIE system of colors was developed by the International Commission on Illumination, or, CIE (see, e.g., G. Wyszecki and W. S. Stiles, *Color Science,* 2nd edition, Wiley, N.Y., 1982). The CIE system is based on the use of spectrophotometers and the concept of a standard observer, expressed in color tables, and, thus, independent of a specific observer.

Display colors are formed by additively combining three, primary, saturated colors, for example, red (R), green (G) and blue (B). A specified number (for example: $2^8=256$ shades) of each primary color is generated by the respective color element in a pixel of the display. In this case each pixel will carry the R, G and B colors in three color elements. For example, in a CRT, when hit by the electron beam, the selected element of a color pixel emits light with its intensity approximately proportional to the electron beam flux. The same happens in the other primary color elements of the same pixel. The actual sensation of color occurs when light, emitted from each of the primary color elements within a pixel, blends in the eye and the visual cortex of the viewer. Because of this, human factors are significant in the perception of displayed colors. A specific, illustrative model for the definition of colors is hereinafter discussed. The invention is not limited to this illustrative color combination model, but, rather, applies to all possible ways of combining additively primary colors.

Figure 1:
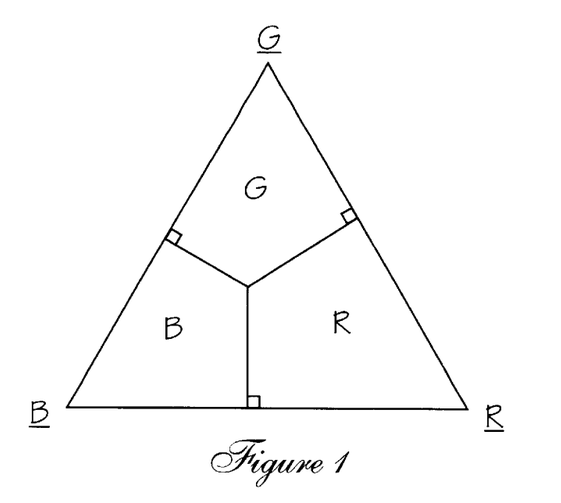
FIG. 1 illustrates a schematic view of tristimulus R, G and B color coordinates.

Assume that the red ($\underline{R}$), green ($\underline{G}$) and blue ($\underline{B}$) primary colors have been defined. This definition includes the tabulation of the intensity-wavelength dependence for each of the primaries. According to the standard color theory, any other color $\underline{C}$ within the color triangle formed by the primaries $\underline{R}$, $\underline{G}$ and $\underline{B}$ can be expressed as a linear combination of the primaries $$\underline{C}=R\underline{R}+G\underline{G}+B\underline{B} \quad (1)$$

where the coefficients R, G and B are the tristimulus values (see FIG. 1). No attempt is made in this disclosure to distinguish between linear and non-linear, e.g., gamma-corrected R, G and B color coordinates. The color defined in Equation (1) can also be specified by using the normalized chromaticity coordinates (r, g) defined by $$r=R/(R+G+B)$$
$$g=G/(R+G+B) \quad (2)$$

In this model, each color $\underline{C}$ is uniquely defined by specifying the three tristimulus values for each pixel. The complete set of colors formed in this fashion, via Equation (1), are called the gamut of colors for the chosen primaries. By specifying these three tristimulus or color coordinate values for each pixel in the N×M array of the display, the entire image has been defined. The tristimulus values correspond to electronic drive signals controlling each color element. For example, in an AMLCD the drive signals are voltages applied to the liquid crystal cells in order to modulate their optical rotation and thus change the optical transmission.

Brightness uniformity describes the ability of the display to define all colors uniformly across the entire pixel array of the display for any predefined combination of the primaries. This requires very good control over both the primaries and the tristimulus values. There are many potential sources of non-uniformities. Electron beam deflection and spot size are the primary sources of color non-uniformity in CRTs, while materials, manufacturing- and backlighting-related issues are the most common factors responsible for non-uniformities in AMLCD displays. Another mechanism giving rise to non-uniformity originates from the additive color formation process under the viewing conditions of the display. For example, an ambient light gradient may introduce a non-uniformity into the additive color sum when the reflected light interferes with the emitted light. This phenomenon limits the use of electronic displays in bright ambient light.

Perception tests with human observers have shown that tristimulus value differences as small as 2 to 4% are observable under demanding viewing conditions. Perception tests also show that gradual color non-uniformities occurring continuously over many pixels are less perceptible, because the observer loses the reference over the area of the display screen. In fact, gradual color coordinate changes as large as 10 to 20% over the size of the display screen may not be disturbing to an average viewer. Under normal viewing conditions, brightness uniformities are more observable when viewed from a greater distance, rather than from up close.

Brightness non-uniformities in monolithic electronic displays are caused by process variations, which tend to cluster into gradual changes over large sections of a display. Therefore, monolithic displays can be manufactured with relatively large process tolerances. On the other hand, abrupt brightness changes between adjacent pixels or groups of pixels are disturbing. Such abrupt non-uniformities arise in displays where each pixel, or array of pixels, has been manufactured separately and then assembled to form a complete, tiled, pixel array. Materials, manufacturing and design-related factors introduce abrupt non-uniformities in tiled displays. Another possible source of non-uniformities in tiled displays arises from the possibility that pixels close to the edge of a tile have different characteristics than do the interior pixels. If uncorrected, this effect may either cause scalloped luminance or chromaticity gradients close to the edge of tiles.

Figure 2:
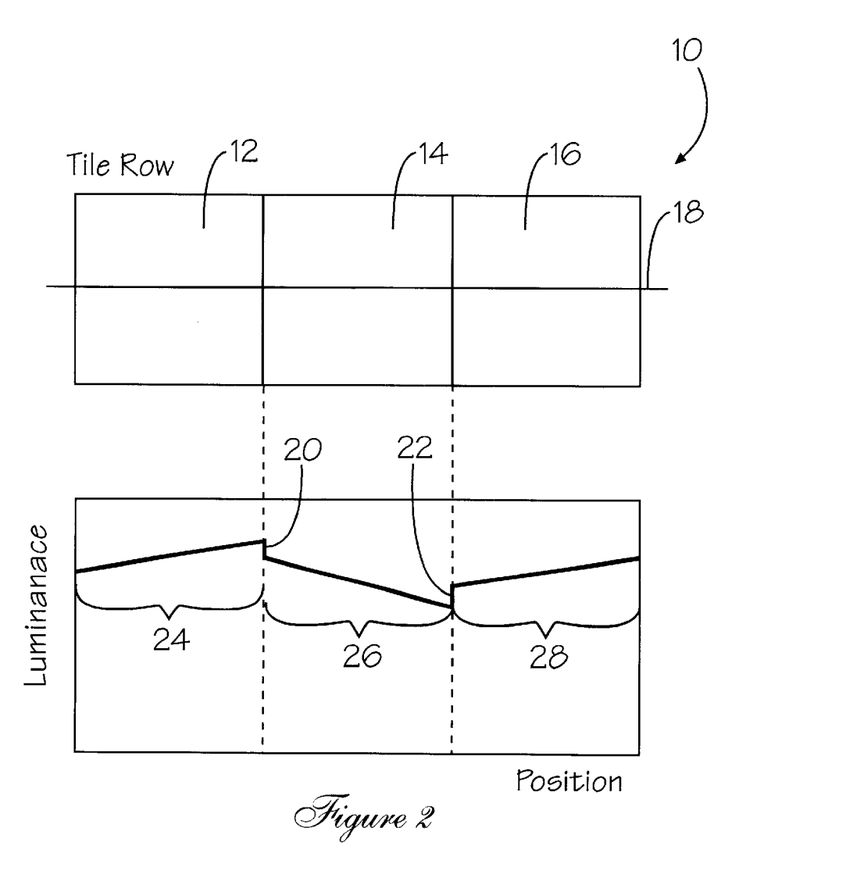
FIG. 2 portrays the luminance of a tiled, electronic color display as a function of position along a line crossing over several display tiles, with the upper panel depicting the line across the tiles and the lower panel, the brightness along the line, and both abrupt and gradual luminance variations shown at the edges of the tiles and on the tiles, respectively.

Referring now to FIG. 2, the combination of both gradual and abrupt brightness non-uniformities on a tiled display is illustrated. The upper portion of FIG. 2 depicts a portion of a row of a tiled, color FPD 10, consisting of three adjacent tiles 12, 14 and 16. Luminance of the tiles 12, 14 and 16 is measured at a number of positions along line 18, placed at an arbitrary position of the tiles 12, 14 and 16. The lower portion of FIG. 2 is a graphical representation of luminance measured along line 18. In this example, abrupt transitions in luminance occur at the boundary of tiles 12 and 14 (as shown as reference numeral 20 on the luminance graph) and at the boundary of tiles 14 and 16 (as shown as reference numeral 22 on the luminance graph). Gradual variations in luminance occur within tile 12, tile 14, and tile 16, as indicated by the respective sloped line portions 24, 26 and 28 of the luminance graph.

This invention covers methods and apparatus that correct for brightness non-uniformities in electronic displays. While the methods work both for gradual and abrupt non-uniformities, they are most useful for the latter, especially for displays that are assembled from single pixels or are tiled from rectangular arrays of pixels.

Description of Brightness Correction Methods

In order to accurately match colors on electronic displays, the perceived brightness and color have to match within the human eye's discrimination threshold. "Brightness" describes the appearance of the radiant flux of an object. The brightness of an object depends on the viewing conditions of the display and the adaptation of the observing eye. The psychophysical equivalent to brightness is luminance, which is, of course, independent of viewing and observation conditions. Luminance is quantified by using the concept of luminous flux per projected area of the source of light. Luminance is often normalized so that white light is assigned a value of 1 on a relative scale. The ability of the human eye to discriminate between two luminances is measured using Weber's fraction. Assume that two objects are viewed side by side, with one object having the luminance of B, and the other B+ΔB. Assume further that ΔB is increased from 0 to a value that makes the brightness of the two objects detectably different. The discrimination threshold value, then, for ΔB defines Weber's ratio as ΔB/B. According to extensive visual discrimination studies, Weber's fraction is not a constant (i.e., Weber's original law), but, rather, depends on the luminance B [S. Hecht, "The Visual Discrimination of Intensity and the Weber-Fechner Law", *Journal of General Physiology*, vol. 7, p. 214, 1924]. However, for the luminance range from 1 to 1000 cd/m² (nit) that is desirable for electronic displays, ΔB/B is approximately constant, and has the value of 0.04 for a dark surround. Weber's fraction increases rapidly for reducing brightness levels, when the eye of the observer goes from photopic to scotopic vision. For example, at 1×10⁻⁶ nit, ΔB/B is 0.14.

In terms of physical quantities, luminance is defined as:

$$B = K_m \int \frac{V(\lambda)P(\lambda)}{\omega \alpha \cos\theta} d\lambda \qquad (3)$$

where $K_m$, $V(\lambda)$, $P(\lambda)$, $\omega$ and $\alpha \cos\theta$ denote the maximum luminous efficiency (683 lm/W), the relative efficiency or luminosity function, radiant flux, solid angle and projected source area, respectively [see, e.g., *Television Engineering Handbook Featuring HDTV Systems*, McGraw-Hill, edited by K. B. Benson, revised by J. C. Whittaker, 1992]). The international standard for luminance is determined by blackbody radiation at 2042 K and is set at 60 nit. Quantities related to luminance that are often used include luminous flux, defined as $F = K_m \int V(\lambda)P(\lambda)d\lambda$ and measured in lumens (lm), and luminous intensity, defined as $I = F/\omega$, measured in lm/steradian.

As can be seen from Equation (3), luminance is an additive quantity. Therefore, the luminance of a color field additively mixed from three components can be written as $$L = RL_R + GL_G + BL_B \qquad (4)$$

where $A_R$, $L_G$ and $L_8$ denote the luminance unit amounts of the primary colors R, G and B. Note that linear, primary excitations are assumed. As an example, for the commonly used CRT phosphors (Rec. 709), the relative primary luminances are $L_R = 0.2125$, $L_G = 0.7154$ and $L_8 = 0.0721$. The unit luminances are usually adjusted so that when they are combined in equal amounts, they will produce the display white, e.g., the CIE illuminant D65 [International Commission of Illumination]. Therefore, in order to make an electronic color display uniform in terms of luminance, the resultant luminance must be controlled within the luminance threshold given by Weber's fraction ΔL/L. Resultant luminance variations in violation of this condition may arise from color coordinate or color element unit luminance variations.

Figure 3:
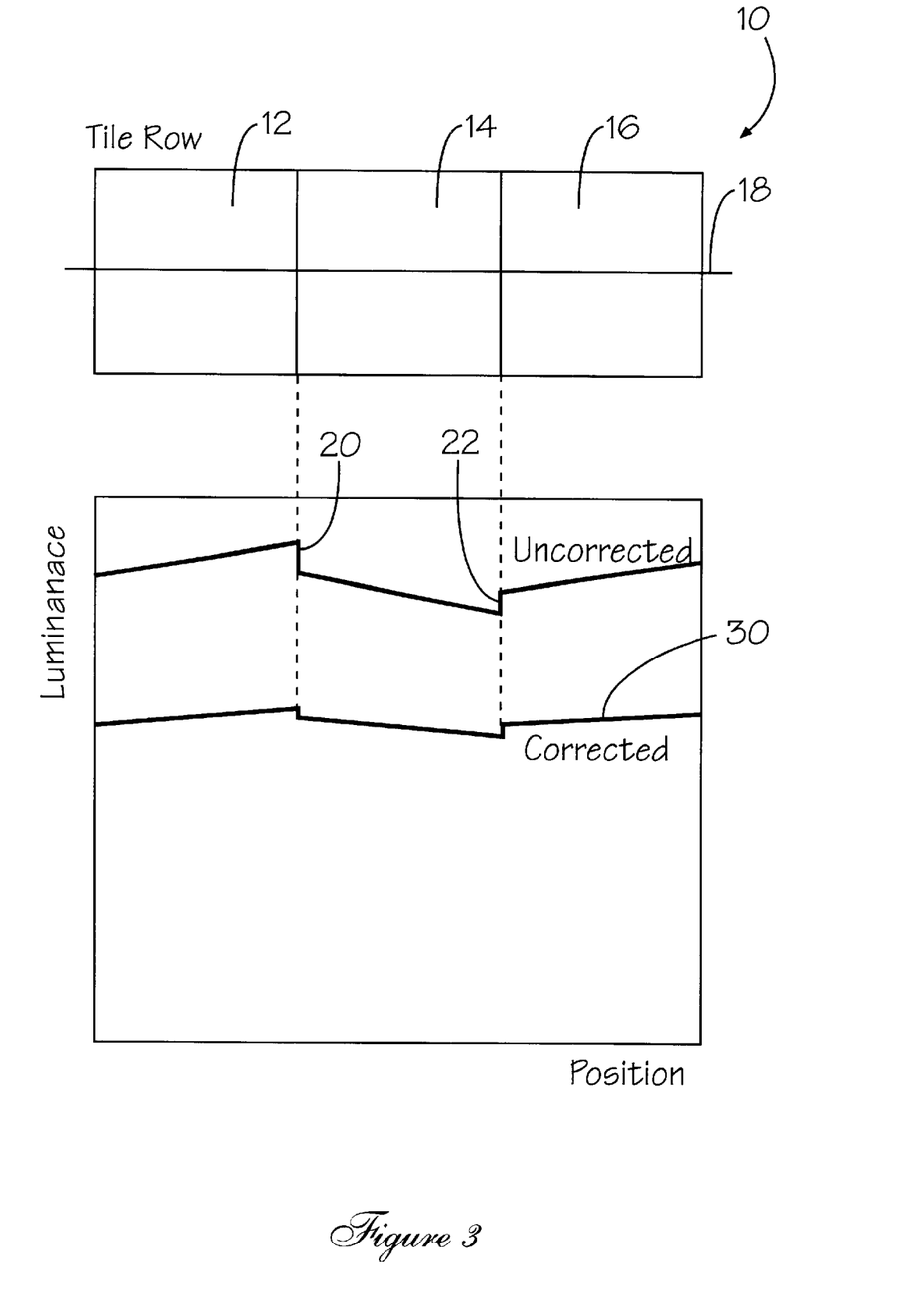
FIG. 3 depicts the luminance of a tiled, electronic color display as a function of position before and after correction, with the detection thresholds for both maximum abrupt and maximum gradient non-uniformities shown as inserts.

This invention includes several different methods for keeping the resultant luminance substantially constant using active control means. Strictly speaking, the luminance threshold applies only to adjacent pixels, or to adjacent groups of pixels with a sharp boundary. For more distant pixels, or groups of pixels, gradual luminance variations as large as 10 to 20% may be permissible. For gradual variations, the gradient of the luminance is the key parameter to control. The luminance may be held substantially constant in many ways by adjusting the three components in Equation (4) relatively independently, as long as the sum is kept constant. This property will be demonstrated hereinafter to correct the brightness, as shown in FIG. 3, so that the remaining variations will be below the detection threshold. The plot 30 of the corrected luminance, measured along line 18, indicates that, after correction procedures are implemented, the intra- and inter-tile luminances are substantially constant (i.e., within the predetermined luminance detection range.)

Four different methods for controlling luminance are hereinafter separately considered in sections labeled (i) through (iv). In the discussion below it is assumed for illustrative purposes that the display is of the normally dark type. In such a display the drive signals control positive brightness contributions from each color element to form the desired brightness for each pixel. However, the methods apply equally well to normally bright displays in which the drive signals reduce the brightness of each pixel from the display white.

Note that the methods described in this invention assume that the pixels selected for correction are active, i.e., that their brightness can be fully modulated between display white and dark. Completely inactive pixels, which can be stuck in the dark, white or intermediate states, will not be considered. However, if the faulty pixels are partially active, the present methods can be used to set these pixels in real time into states closest to the brightness of adjacent pixels, and thus make them least disturbing to the observer for the displayed image.

(i) Uniform Color Coordinates and Uniform Primary Luminances

In this method, both R, G and B color coordinates and $L_R$, $L_G$ and $L_B$ primary unit luminances are kept uniform within the luminance threshold discrimination range. This can be done by controlling materials, design and manufacturing parameters individually to tolerances that do not exceed the resultant luminance discrimination threshold for adjacent pixels, and/or the gradient rule for remote pixels. Monolithic displays should meet the gradient rule, primarily, since manufacturing parameters over the area of the screen tend to vary smoothly. For example, in a monolithic CRT, this requires that the color phosphors, shadow mask patterns and the beam flux are kept constant within the gradient rule over pixels selected for correction in the display. Similarly, for monolithic AMLCDs, the backlighting, AMLCD cell, color filter and polarizers must meet the constancy requirements. For tiled displays, whether using single pixels or arrays thereof, the luminance threshold rule applies. Irrespective of the type of display, this requires much more stringent control of the parameters. Therefore, this method may be impractical for tiled displays.

(ii) Uniform Color Coordinates and Non-Uniform Primary Luminances

With color coordinates uniform and primary luminances varying, pixel luminances will not be uniform over the area of the display. In order not to exceed either the luminance discrimination threshold or the gradient rule for adjacent or distant pixels, the product terms $R\,L_R$, $G\,L_G$ and $B\,L_B$ in Equation (4) may be adjusted. Any procedure which matches the resultant luminances is acceptable, since no other constraints are considered herein.

The simplest way to correct for constant total luminance is to recompute the color coordinates from $$R'=RL_R/L_{R'}$$
$$G'=GL_G/L_{G'}$$
$$B'=BL_B/L_{B'} \quad (5)$$

Here, $L_{R'}$, $L_{G'}$ and $L_{B'}$ are primary luminances of a reference system, which is kept common for all pixels. In CRTs, the color coordinates can be changed by adjusting the beam current emanating from the three electron guns. Similarly, in AMLCDs, the drive voltage administered to each color element may be adjusted, which, through the light transmission-voltage curve, then changes the color coordinates of each primary color. If each product term is adjusted in this fashion, not only does the resultant luminance remain constant, but also the white point will be uniform. Note that Equations (5) have been written for a normally dark display with a uniform dark state. If no uniform dark exists these equations can be modified to read $$R'+R'_r=(R-R_r)L_R/L_{R'}$$
$$G'+G'_r=(G-G_r)L_G/L_{G'}$$
$$B'+B'_r=(B-B_r)L_B/L_{B'} \quad (6)$$

where ($R_r$, $G_r$, $B_r$) and ($R'_r$, $G'_r$, $B'_r$) denote reference systems of the uncorrected and corrected displays. Equations (6) reduce to (5) for a uniform normally dark display with zero brightness in that state.

Color coordinate adjustment requires knowledge of the primary luminance variations across the pixel array. Luminance can be measured, after the display is fabricated, for each pixel and then stored electronically in a memory, for example a non-volatile random-access memory (NV-RAM). The coefficients in Equation (5) are independent of the color coordinate values, because of the linearity of the equations. The arithmetic operations in Equation (5) can be performed a priori; hence, only pointers need to be stored. The pointers can be actual coordinate values or, alternatively, relative corrections (R'–R), (G'–G) and (B'–B). Because color coordinates in practical displays are discretized to no more than 8 bits ($2^8$=256 levels), the amount of storage required is, then, 3 colors ×8 bits =24 bits per pixel. With a resolution of 1024×768, then, no more than 18.8 Mbits are needed for storage. Actual memory capacity requirements may be much less than this. In the special case of tiled displays, if pixels on each tile are identical but variations between tiles occur, only 24 bits per tile are needed, and luminance corrections for all pixels on each tile will be identical. Memory requirements can be further reduced, if interpolation techniques are used. In this case, interpolation computations may be performed in real time.

The reference system is chosen so that the same system may be used for all pixels in the display. By construction, most displays do not allow the color coordinates to be increased beyond a certain limit, because R', G' and B' do have an upper boundary that can be adjusted only downward. These color coordinates also have lower limits, because luminance by definition is a positive, definite quantity. These properties may noticeably reduce the maximum brightness of the display and, consequently, also lower the contrast. Because of this effect, then, large brightness corrections may be undesirable.

Figure 4:
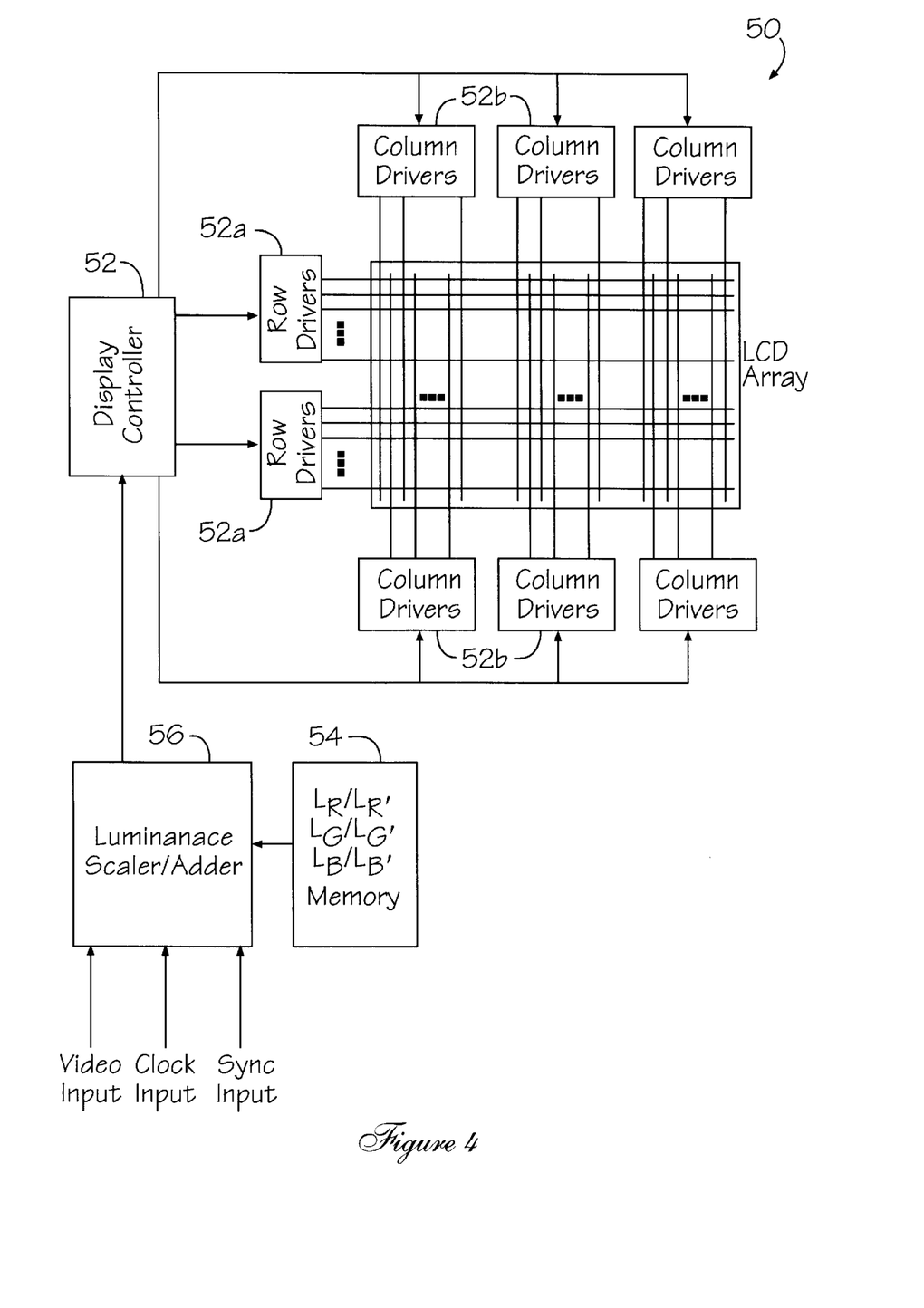
FIG. 4 shows a block diagram of one embodiment of a luminance correction method of this invention.

Referring now to FIG. 4, there is shown a block diagram 50 of a luminance correction method. The computations in Equations (5) may be implemented in several ways, in addition to that shown here for purposes of disclosure, using electronic signal processing means commonly used in displays. In one embodiment (serial scaling), the color coordinates are recomputed before they reach the display controller 52, operatively connected to row drivers 52a and column drivers 52b, typically used with conventional displays, not shown. The luminance ratios are stored in a central random access memory 54 ordered according to a pixel scan order.

The stored luminance ratios are then used by the video or luminance scaler/adder 56 to normalize the color coordinates according to Equations (5) for a normally light display. This requires that the luminance scaling operations be performed at the actual video data rate. For example, at the frame rate of 72 Hz and a resolution of 640×480, 48 ns are available to perform the three scaling operations for each pixel. The three scaling operations are independent of each other and can thus be performed in parallel, if desired. To implement Equations (6) for a normally dark display, the adder portion of scaler/adder 56 is used in addition to the scaler portion because of constants in Equations (6) that do not appear in Equations (5).

Figure 5:
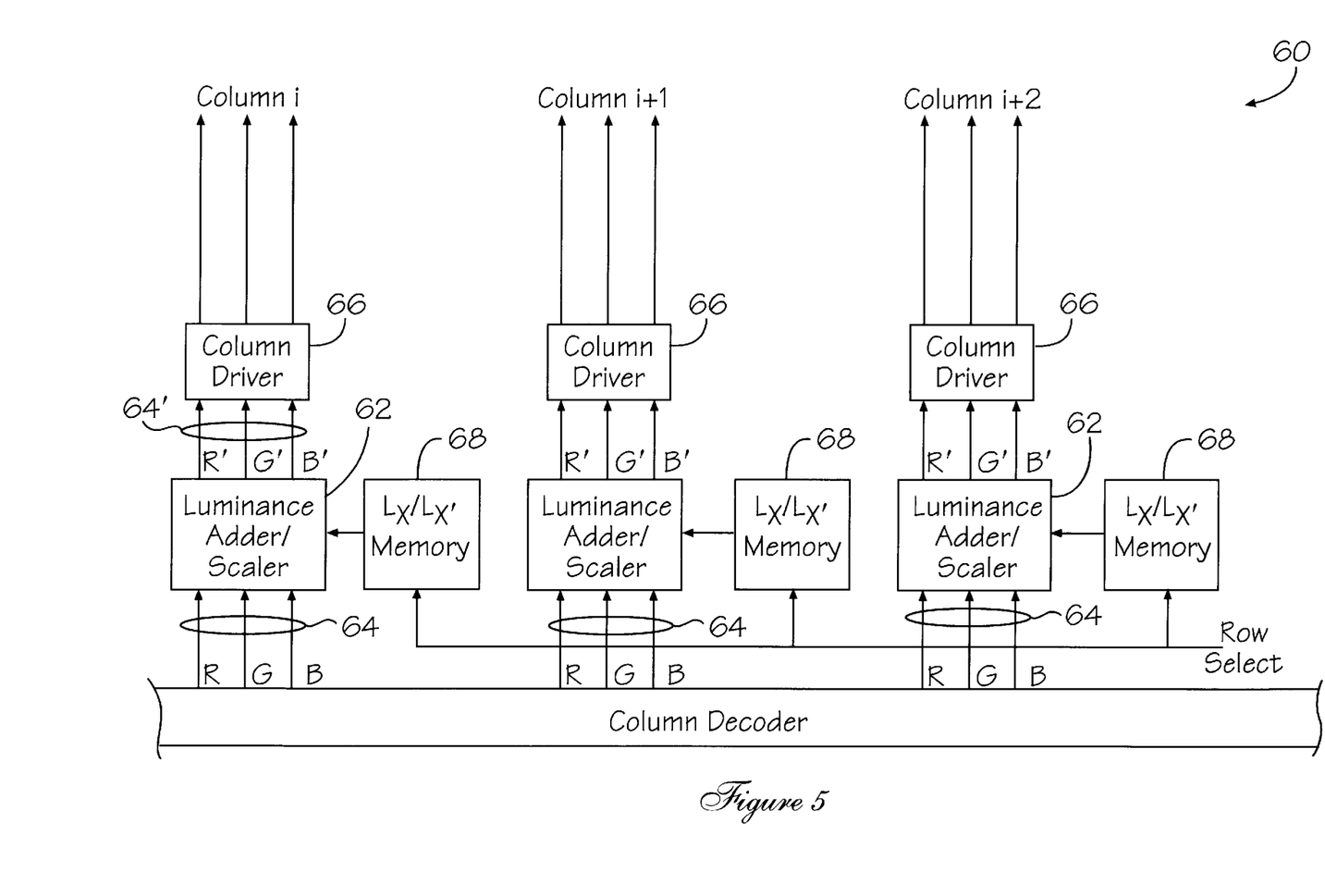
FIG. 5 shows a block diagram of one embodiment of the luninance correction method of this invention, depicting a parallel implementation with luminance scaling scalers and coefficient memories operating on the bit stream arriving at each column driver circuit of a normally dark display.

In the preferred embodiment (parallel scaling) 60 shown in FIG. 5, luminance scalers/adders 62 are placed into a pixel stream 64 associated with each column driver 66.

Data from luminance ratio memory 68 is also applied to corresponding scalers/adders 62. Modified pixel stream 64'consists of the normalized data to be applied to the column drivers 66.

Alternatively scalers/adders 62 and memories 68 can be integrated into the column driver circuit 66. The total memory capacity is the same as for the serial scaler/adder 56 (FIG. 4), but it is now assigned into small blocks, each accommodating luminance ratios for one column of pixels. The number of luminance scalers in this case equals the number of columns and hence 29 $\mu$s are available to perform each scaling operation in the above example.

After some time in use, the primary luminance measurements can be repeated and the contents of the memory changed, in order to compensate for the non-uniform aging of the display. This can be done at a service workshop or with suitable portable equipment at the site of the end user.

The same principle can be used as the basis for constructing a self-calibrating display. The brightness measurements and parameter computations can be made automatically under the control of a built-in controller periodically, or as initiated by the user, each having color coordinates.

Figure 6:
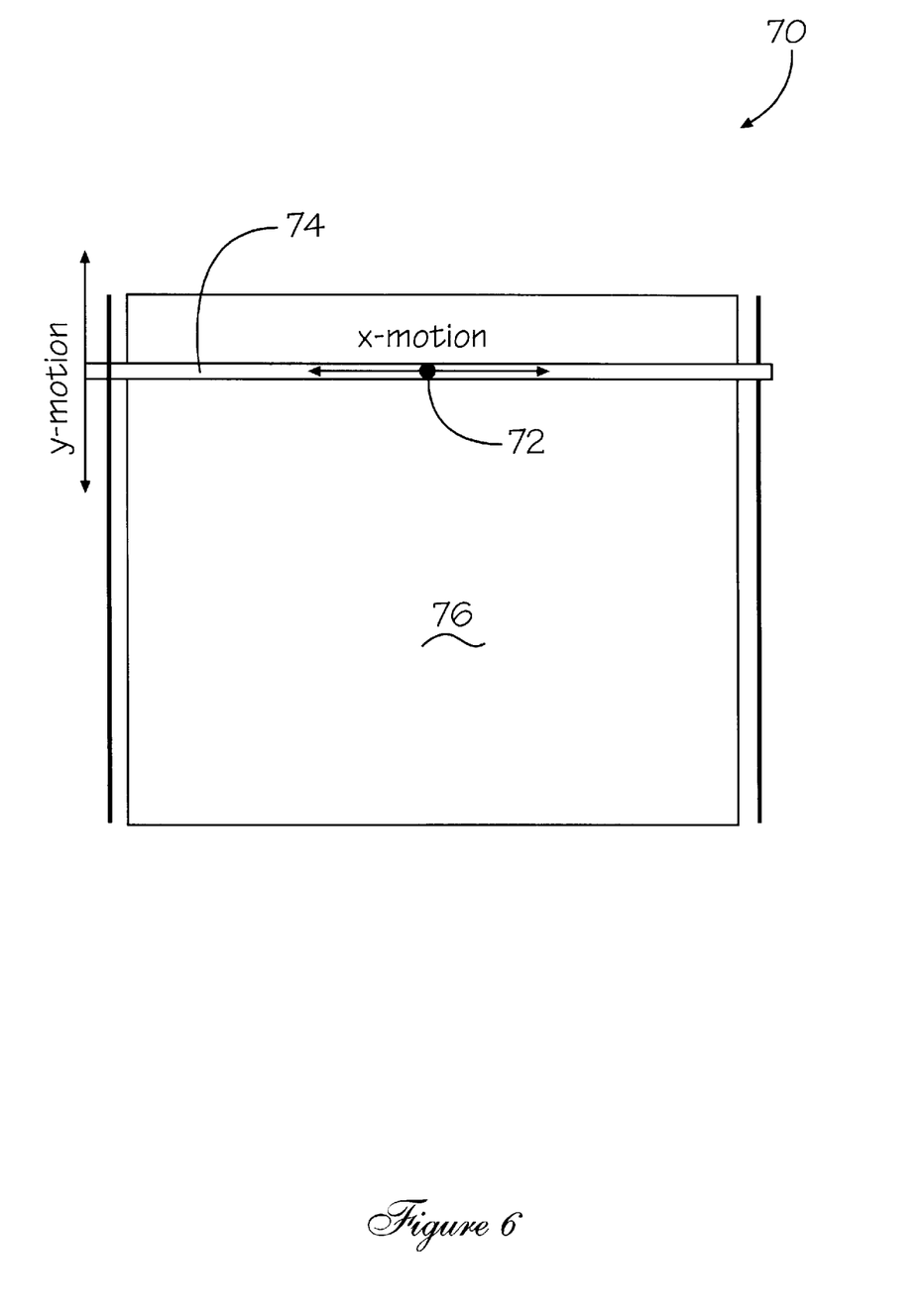
FIG. 6 depicts a self-calibrating apparatus mounted on a flat panel display with a photodetector mounted on a movable arm in order to provide an x-y pixel scan capability.
Figure 7:
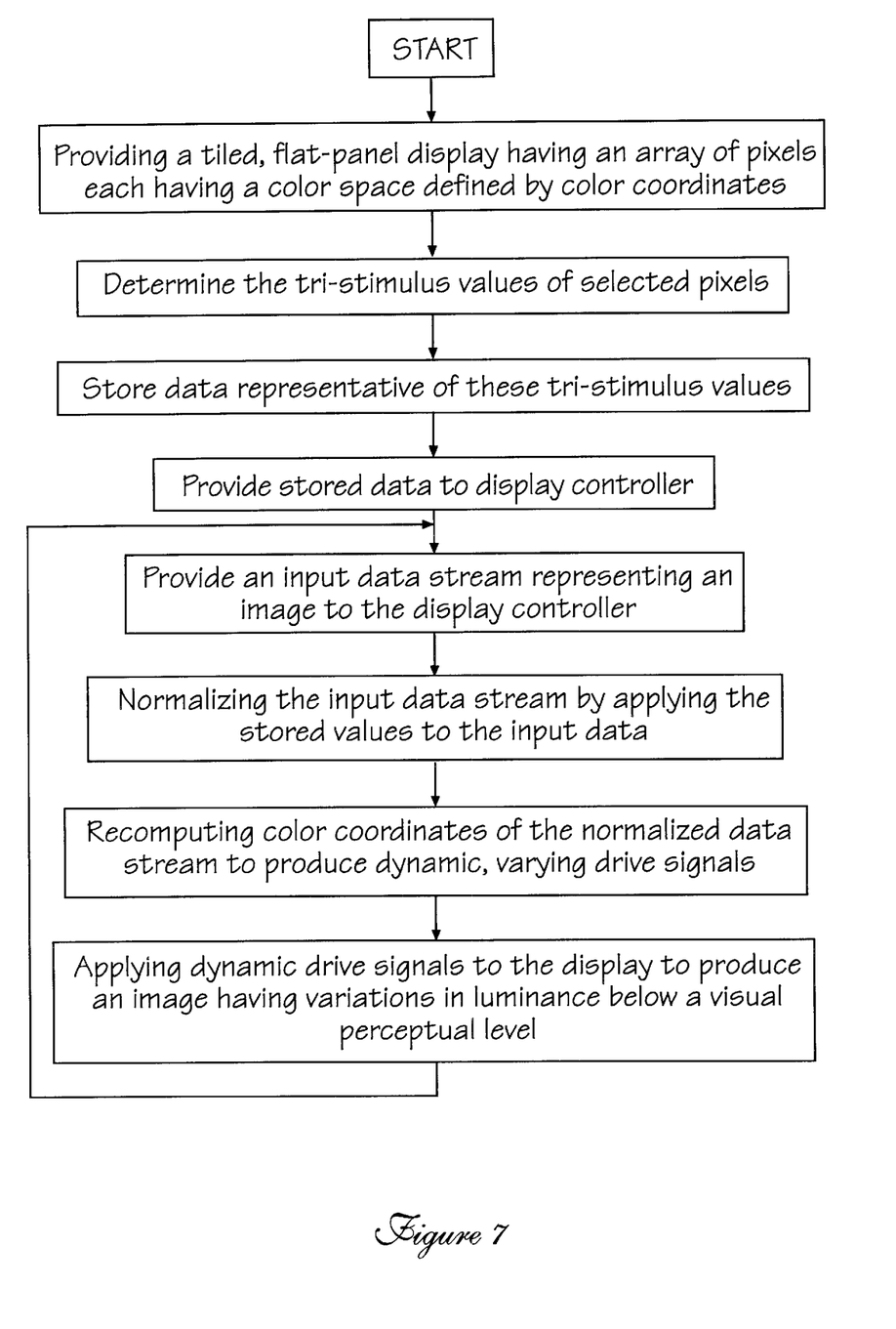
FIG. 7 is a flowchart of the steps of the color and luminance correction method of the invention.

Referring now to FIG. 6, a photodetector 72 movably mounted (on an x-y arm assembly 74, for example) provides the measured data when scanned over the surface of the screen 76. The x-y arm assembly 74 can be parked inside the housing of the display, not shown, away from the viewable area of the screen, when the self-calibration function is not in use.

(iii) Uniform Primary Luminances and Non-Uniform Color Coordinates

In this method, the primary luminances are considered uniform and the color coordinates vary due to non-idealities related to the design, manufacturing or operation of the display. The correction method proceeds in a manner analogous to method (ii), if the variations of the color coordinates for each pixel are predictable. Again, the pixel element color luminance products must be kept constant by adjusting the color coordinates as defined by $$R'=f_R(R)$$
$$G'=f_G(G)$$
$$B'=f_B(B) \quad (7)$$

Here it is assumed that the functions $f_R(R)$, $f_G(G)$ and $f_B(B)$ have a sufficiently simple form, which is independent of the value of R, G and B, but does depend on the pixel. The transformations, then, can again be measured and stored in a memory in a convenient way. The amount of data to be stored depends on the functions $f_R(R)$, $f_G(G)$ and $f_B(B)$. For example, if the $f_R(R)=R+a$ (uniform offset), with similar equations holding for other functions, $f_R$, $f_G$, $f_B$, the values of a are stored for each color element and pixel. This requires the same amount of memory as case (ii). If $f_R(R)=bR+a$ (linear dependence and uniform offset), both values of data (b,a) are stored. Three multiplications and three additions are then performed in real time for each pixel. With a frame rate of 60 Hz and a resolution of 1024×768, for example, there will be on the order of 21 ns to perform these operations, if just one eight-bit binary adder and one eight-bit binary multiplier are available. If, on the other hand, there are 3×1024 adders and multipliers (one set for each color element in each pixel), there will be 21 $\mu$s to perform these operations. Serial and parallel circuit implementations of this correction method are similar to those presented in the previous section (see FIGS. 4 and 5) except for the fact that functional units performing scaling are replaced with functional units for interpolation. Criteria for choosing the reference system are the same as discussed above. Modifications for displays with a non-uniform dark state can be done as described before. For tiled displays having uniform color coordinates on each tile, but with variations among the tiles, the storage requirements are again reduced, compared to variations across all pixels. Simple binary multiplications and additions like the ones discussed above can also be simply built into the driver electronics inexpensively. Thus, this method is feasible to implement for low-order polynomial functions $f_R(R)$, $f_G(G)$ and $f_B(B)$.

(iv) Non-Uniform Color Coordinates and Non-Uniform Primary Luminances

In this method, both color coordinates and primary luminances vary due to parameters related to design, materials, manufacturing or operational factors. If, again, both color coordinates and primary variations are predictable across the pixel array, they can be corrected in much the same way as described above. Now, one may combine the procedures in (ii) and (iii). As can be seen from Equation (5), there is no unique solution from the point of view of luminance, since only the products R $L_R$, G $L_G$ and B $L_B$ are defined. The storage requirements are on the order of the sum of methods (ii) and (iii).

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for correcting spatial non-uniformities in luminance outside of a predetermined luminance variation detection range in order to provide a tiled, color flat-panel display with the appearance of having a uniform brightness, said method comprising the steps of:

a) providing a tiled, color, flat-panel display capable of displaying moving images at a predetermined refresh rate, comprising a plurality of individual display tiles having seams therebetween, each of said individual display tiles comprising an array of color pixel elements, each pixel element comprising an individual color space having color coordinate and being adapted to receive a data stream and altering its color characteristics in response thereto, said color, flat-panel display exhibiting gradual non-uniformities or abrupt non-uniformities in luminance;

b) measuring the primary luminance variations between at least two of said individual color spaces associated with at least two of said color pixels of said tiled, color, flat-panel display;

c) determining tristimulus values associated with said measured luminance variations of step (b);

d) electronically storing values representative of said tristimulus values;

e) using luminance scaler/adder means operatively connected to said tiled, color, flat-panel display to receive a continuous video input signal and to recompute color coordinates, in accordance with said electronically stored values, at substantially said predetermined refresh rate to produce a normalized data stream; and f) selectively applying said normalized data stream to display controller means operatively connected to at least one of: row driver means and column driver means, operatively connected to at least one of said pixels, thereby adjusting primary luminances of color spaces associated with said pixels in said tiled, color, flat-panel display which will result in matching of the luminances of said two pixels thereby correcting spatial non-uniformities in the luminance between said pixels of said tiled, color flat panel display in accordance with a gradient rule, whereby spatial non-uniformities in luminance are reduced below said predetermined detection range.

2. The method for correcting spatial non-uniformities in luminance for color, flat-panel displays as recited in claim 1, wherein said sub-step of adjusting drive signals comprises at least one from the group of: adjusting drive voltages, adjusting drive current, adjusting drive pulse width, adjusting drive signal modulation, or adjusting drive pulse repetition rate.

3. The method for correcting spatial non-uniformities in luminance for an electronic color, flat-panel display in accordance with claim 1, further comprising the step of:

e) controlling manufacturing parameters of said electronic color, flat-panel display during manufacture so that each color pixel of said electronic color, flat-panel display falls within a predetermined luminance detection range for adjacent pixels and a gradient rule for remote pixels.

4. The method for correcting spatial non-uniformities in luminance for an electronic color, flat-panel display in accordance with claim 1, wherein said measurements obtained in step (b) are electronically stored in accordance with step (c) in a non-volatile memory.

5. The method for correcting spatial non-uniformities in luminance for an electronic color, flat-panel display in accordance with claim 1, wherein data representative of said measurements obtained in step (b) are electronically stored in accordance with step (c), utilizing interpolation techniques.

6. The method for correcting spatial non-uniformities in luminance for an electronic color, flat-panel display in accordance with claim 5, wherein said stored data is used in the processing of drive signals for correcting spatial non-uniformities in real time.

7. The method for correcting spatial non-uniformities in luminance for an electronic color, flat-panel display in accordance with claim 1, wherein the measurement of said primary luminance variations across color pixels of said tiled, color, flat-panel display in accordance with step (b) is repeated and further wherein said electronically stored values in accordance with step (c) are changed.

8. The method for correcting spatial non-uniformities in luminance for an electronic color, flat-panel display in accordance with claim 7, wherein said measuring step (b) comprises sampling luminance of selected pixels using photo-sensing means.

9. The method for correcting spatial non-uniformities in luminance for an electronic color, flat-panel display in accordance with claim 1, wherein each of said tiles. comprises an array of pixels.

10. The method for correcting spatial non-uniformities in luminance for an electronic color, flat-panel display in accordance with claim 1, wherein each of said tiles comprises a single pixel.

11. A method for correcting spatial non-uniformities in luminance outside of a predetermined luminance variation detection range, said spatial non-uniformities being gradual non-uniformities, or abrupt non-uniformities arising in an electronic color, flat-panel display having a plurality of tiles comprising color pixels, each pixel comprising an individual color space and being adapted to vary a color characteristic in response to a varying drive signal, in order to provide the tiled, color, flat-panel display with the appearance of having a uniform brightness, said method comprising the steps of:

a) measuring primary luminance variations across predetermined color spaces, each having color coordinates, associated with said color pixels of a tiled, color, flat-panel display;

b) determining tristimulus values associated with said measured primary luminance variations of step (a);

c) electronically storing values representative of said tristimulus values;

d) modifying said electronically stored values by applying a gradient rule thereto, resulting in modified, electronically stored values;

e) using luminance scaler/adder means operatively connected to said flat-panel display to receive a continuous video input signal and to recompute color coordinates, in accordance with said modified, electronically stored values, at a predetermined refresh rate associated with said flat-panel display to produce a normalized data stream; and f) selectively applying said normalized data stream to at least one of said pixels for adjusting primary luminances for pixels for adjusting primary luminances of color spaces associated with said pixels in said tiled, flat-panel display by adjusting said normalized data stream applied to color pixels in said tiled, color, flat-panel display, which will result in reducing spatial non-uniformities in the luminance of said tiled, color, flat-panel display to below said predetermined luminance variation detection range, thereby facilitating visually imperceptible seams between the tiles of said display.

12. A method for correcting spatial non-uniformities in luminance for an electronic color, flat-panel display in accordance with claim 11, further comprising the step of:

g) controlling manufacturing parameters of said electronic color, flat-panel display during manufacture thereof, so that each color pixel of said electronic color, flat-panel display falls within a resultant luminance discrimination threshold for adjacent pixels and a gradient rule for remote pixels.

13. The method for correcting spatial non-uniformities in luminance for an electronic color, flat-panel display in accordance with claim 11, wherein said measurements obtained in step (a) are electronically stored in accordance with step (b) in a non-volatile memory.

14. The method for correcting spatial non-uniformities in luminance for an electronic color, flat-panel display in accordance with claim 11, wherein data representative of said measurements obtained in step (a) are electronically stored in accordance with step (b), utilizing interpolation techniques.

15. The method for correcting spatial non-uniformities in luminance for an electronic color, flat-panel display in accordance with claim 14, wherein said stored data is used in the processing of drive signals for correcting spatial non-uniformities in real time.

16. The method for correcting spatial non-uniformities in luminance for an electronic color, flat-panel display in accordance with claim 11, wherein the measurement of said primary luminance variations across color pixels of said tiled, color, flat-panel display in accordance with step (a) is repeated after a period of usage of said tiled, color, flat-panel display, and further wherein said electronically stored values in accordance with step (b) are changed in order to compensate for aging of said tiled, color, flat-panel display.

17. The method for correcting spatial non-uniformities in luminance for an electronic color, flat-panel display in accordance with claim 16, wherein said measuring step (b) comprises sampling luminance of selected pixels using photo-sensing means.

18. The method for correcting spatial non-uniformities in luminance for an electronic color, flat-panel display in accordance with claim 11, wherein said tiled, color, flat-panel display comprises tiles having an array of pixels.

19. The method for correcting spatial non-uniformities in luminance for an electronic color, flat-panel display in accordance with claim 11, wherein said tiled, color, flat-panel display comprises tiles having a single pixel.

20. The method for correcting spatial non-uniformities in luminance for an electronic color, flat-panel display in accordance with claim 11, wherein the primary luminance of any of said predetermined color pixels that is only partially active is adjusted to the luminance level of adjacent pixels so that said partially active pixel has an appearance that is least disturbing to an observer.

21. A method for self-calibrating spatial non uniformities in luminance outside of a predetermined luminance variation detection range in order to provide a tiled, color flat-panel display with the appearance of having a uniform luminance, said method comprising the steps of:
   a) providing a tiled, color flat-panel display comprising individual display tiles having seams therebetween, said individual display tiles comprising arrays of color pixels that vary a color characteristic in response to a data stream applied thereto to vary a display color, said color, flat-panel display exhibiting gradual non-uniformities or abrupt non-uniformities in luminance, said color, flat-panel display having built-in luminance calibration capability;
   b) measuring primary luminance variations across predetermined color pixels each having an individual color space associated therewith, of said tiled, flat panel color display;
   c) determining tristimulus values associated with said measured primary luminance variations of step (b);
   d) electronically storing values representative of said tristimulus values;
   e) using luminance scaler/adder means operatively connected to said tiled, color, flat-panel display to modify a continuous video input signal in accordance with said electronically stored values, at a predetermined refresh rate to produce a normalized data stream;
   f) calibrating primary luminances for selected pixels in said tiled, color flat panel display by applying said normalized data stream to at least one of said color pixels, to calibrate spatial non-uniformities in the luminance of said tiled, color flat panel display.

22. The method for self-calibrating spatial non-uniformities in luminance in a color flat panel display as recited in claim 21, the steps further comprising:
   f) periodically repeating steps (b) through (e), thereby electronically storing updated values corresponding to primary luminance variations so that time-varying primary luminance variations across said tiled, color flat panel display may be corrected.

23. The method for self-calibrating spatial non-uniformities in luminance in a color, flat-panel display, as recited in claim 22, wherein said sub-step of adjusting drive signals comprises at least one from the group of: adjusting drive voltages, adjusting drive current, adjusting drive pulse width, adjusting drive signal modulation, or adjusting drive pulse repetition rate.

24. The method for self-calibrating spatial non-uniformities in luminance in a color, flat-panel display, as recited in claim 22, wherein said measurements obtained in step (b) are electronically stored in accordance with step (d) in a non-volatile memory.

25. The method for self-calibrating spatial non-uniformities in luminance in a color, flat-panel display, as recited in claim 22, wherein data representative of said measurements obtained in step (b) are electronically stored in accordance with step (d), utilizing interpolation techniques.

26. The method for self-calibrating spatial non-uniformities in luminance in a color, flat-panel display, as recited in claim 25, wherein said stored data is used in the processing of drive signals for correcting spatial non-uniformities in real time.

\* \* \* \* \*